Patented Apr. 6, 1943

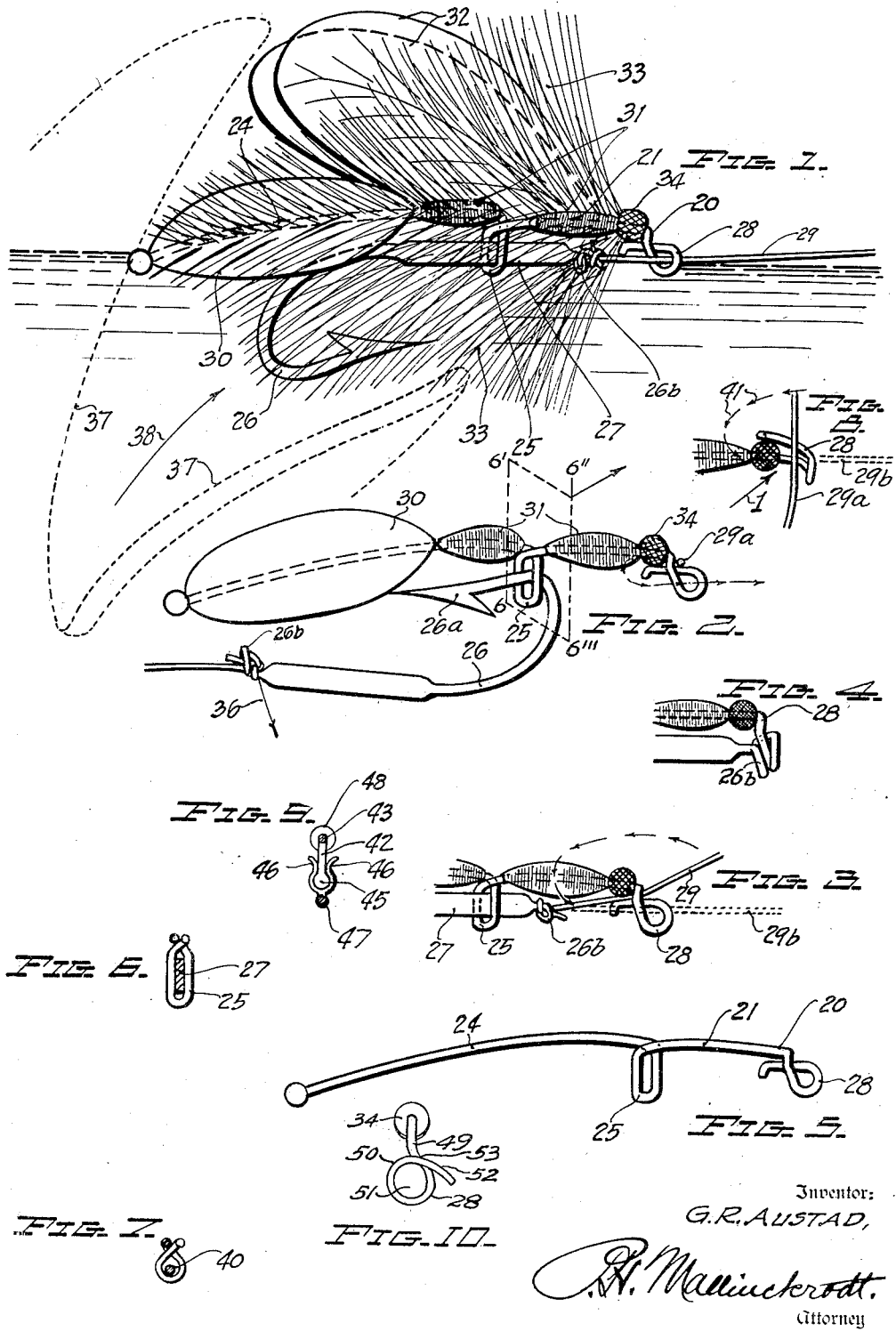

2,315,575

UNITED STATES PATENT OFFICE 2,315,575

DETACHABLE FISHING FLY OR LURE

Grover R. Austad, Salt Lake City, Utah

Application October 20, 1939, Serial No. 300,449

18 Claims. (Cl. 43—48)

This invention relates to a detachable fishing fly, and its principal objects are:

*First.*—To be simply and speedily attachable to, or detachable from, an ordinary hook and leader, which means that neither the hook nor the leader need ever be detached from the line in order to change flies.

*Second.*—To provide maximum concealment of the hook under an ample hackle.

*Third.*—To provide a means of attachment between the fly and hook and leader which is neither bulky nor conspicuous.

*Fourth.*—To lessen the usual wear and tear on a fly.

*Fifth.*—To obviate the danger of having a fly becoming hooked or caught in the clothing or person of the fisherman.

*Sixth.*—To be as effective as the best of the conventional type of fly, with the added advantage of having the body tip free from the conventional hook or barb.

*Seventh.*—To more readily hook the fish because of the fact that a fly when snapped at by the fish from the rear or underneath, will move forward on the attached hook leaving the barb thereof sufficiently free for efficient penetration.

*Eighth.*—To provide greater simplicity in manufacture, since a fly if constructed in accordance with the disclosure hereinafter set forth is separate from the hook, thereby obviating interference with the hook or barb during the wrapping process.

*Ninth.*—To so construct a fly, that certainty in attaching the fly to the hook is assured even when manipulated by unskilled persons.

*Tenth.*—To require only one hook and one leader for an indefinite number of flies.

*Eleventh.*—To reduce the number of different sizes of hooks required.

*Twelfth.*—To obviate the breaking off a piece of leader and wasting it, each time a fly is changed.

*Thirteenth.*—To permit the attachment or detachment, as the case may be, from a hook wholly by the sense of touch, hence the operation can be performed by a person with poor eyesight, or in the dark.

*Fourteenth.*—To greatly reduce the size of the hook, from that required in present practice, for the same hooking efficiency, because no part of the space between the barb and the shank of the hook is taken up by fly-body wrapping; as a result, the fly floats higher and longer.

Heretofore, except in the case of snelled flies, it has been necessary for a fisherman to thread a leader through a minute eye, simply because a fly and a hook have always been associated together integrally. Therefore, in changing flies, which is commonly necessary in finding the proper lure, it has been frequently necessary to repeat the tedious operation of attaching the fly to the leader many times in even comparatively short periods of time. Also, every time an ordinary fly is substituted for another, a certain portion of the leader gut must be broken off and wasted. In extended periods of fishing, this alone represents a considerable economic loss.

In the present invention, the fly, instead of being mounted as an integral part of the hook, is integral only with an individual mounting which is detachably fastened to the hook. This allows a fisherman to try a large number of different flies without waste of time or waste of the leader gut.

In general, the leader is secured to the hook in a way that is substantially permanent; advantageously, by means of a complicated knot. My improved fly, which is provided with a self-threading frontal eye and a fastening which may be in the form of a closed loop spaced apart backwardly from the frontal eye, is attached to the hook and leader by putting the barbed point of hook through the closed loop and swinging the shank of the hook around towards the frontal eye, the leader at the same time being slipped into the eye which is easily accomplished owing to the self-threaded properties of the eye. In the final fishing position, the shank of the hook rests against the frontal eye, in which position the fly is ready for use. In changing flies, all that is necessary is to slip the leader out of the frontal eye, which now acts in a self-unthreading capacity, and to draw the hook around through, and out of, the loop fastening. Each operation, that is to say attaching the fly to the hook or detaching it therefrom, requires only a few seconds of time. The fact that the fly and its mounting are entirely separate from the hook, makes it possible to permanently and securely attach the leader to a hook as aforesaid, by means of the most complicated knot. This is quite different from tying a leader to a fly, and untying, or breaking it off, each time a different fly is tried. Experienced fishermen will remember that many times fish are lost because of insecurely tied knots—it being well known that unless sufficient time and care are taken in tying a knot, that a wet, slippery leader becomes easily detached from the fly.

In the drawing, which illustrates a specific embodiment of the invention,

Fig. 1 is a view in perspective, looking in the general direction of the arrow 1 in Fig. 8, and represents my improved fishing fly attached to a hook and leader in the position occupied when floating as a lure on the water;

Fig. 2, a fragmentary portion of Fig. 1, showing an alternate position of certain parts at the beginning of the operation of attaching the fly structure to the hook and leader;

Fig. 3, a fragmentary portion of Fig. 1, showing the leader in the act of being threaded into the open loop at the head of the fly structure;

Fig. 4, a fragmentary side elevation, showing the forward part of the fly structure drawn up against the eye of the hook in the final fishing position;

Fig. 5, a view in perspective, of the skeleton stripped;

Fig. 6, a cross-section taken in the plane 6—6'—6''—6''', Fig. 2;

Fig. 7, a cross-section similar to Fig. 6, but showing an alternate construction;

Fig. 8, a fragmentary plan corresponding to Figures 1 and 2;

Fig. 9, a cross section taken similarly to Fig. 6, but showing an alternate construction for attaching the hook and leader to the fly structure; and Fig. 10, a front elevation, viewed from the right in Fig. 4.

Referring to the drawing, the numeral 20 denotes a skeleton upon which a fly proper may advantageously be constructed—the skeleton being, for example, made of metallic wire such as silver steel. The skeleton advantageously consists of a body portion 21 and a tail portion 24, the body and tail being connected to each other by means of at least one loop 25.

It is desirable that there shall be substantially no axial motion longitudinally between the skeleton and hook, and to this end the loop 25 is advantageously elongated so as to keep the flattened shank 27 from angular motion around its longitudinal axis, thereby holding the two portions in positive axial relationship to each other.

Advantageously, at the forward end of the body-portion 21 is a fastening 28 in the shape of a self-threading eye which serves to engage the leader 29. The reason for having the fastening self-threading or open is that after the hook has been engaged with the loop 25, the leader can be slipped into the fastening 28 by exercising only the sense of touch and without any tedious threading such as is necessary in the case of a closed eye. The manner of self-threading the leader 29 in the fastening 28 is indicated in Fig. 3—the procedure being described in detail hereinafter.

The exact construction of the fly proper may vary greatly, just as the natural flies that serve as food for fish are of wide variation. In the present particular example, the body-tip of a fly is indicated at 30, the middle-body portion at 31, the wing at 32, and the head at 34. As indicated in Fig. 1, the body-tip 30 may occupy a considerable portion of the skeleton tail 24 while the middle-body portion 31 may be located largely on the skeleton body 21. Both the body-tip 30 and the hackle may be made up of streamer hairs as usual. The hackle is indicated at 33.

In attaching or mounting my improved fly on a hook, the operation is advantageously as follows: The hook 26 is held in a convenient position, such as is indicated in Fig. 2, while the loop 25 is entered over the barbed portion 26a of the hook, after which, the shank of the hook is swung around approximately in the direction of the arrow 36 until the eye 26b comes approximately into the position indicated in Fig. 3, after which the leader 29 is drawn through the self-threading eye 28, somewhat after the manner indicated in Fig. 3, where a subsequent looping motion of the leader, approximately along the path indicated by the small arrows, will cause the leader to be automatically threaded in the eye in approximately the position indicated by the dotted lines 29b in Fig. 3 and by the full lines 29 in Fig. 1. A slight pull on the leader will cause the eye 26b of the hook to be drawn up against the eye 28 of the fly skeleton and to come to rest in the final position indicated in Fig. 4. The fly is now ready to be used in casting in the usual manner.

It is to be observed that the eye 26b of the hook, Fig. 4, is slightly inclined outwardly relative to the shank 27 as usual. Similarly, the eye 28 is inclined so that after the leader 29 is pulled forward, the tendency is to assist in preserving the angular axial relation between the hook and the fly. This particular feature is of considerable value when the shank of the hook is round as indicated at 40 in the alternate construction represented in Fig. 7.

The self-threading eye constitutes an important part of the invention and consists of a peculiar construction, the outstanding feature of which is a line or leader threads securely into the eye at any point between the two ends of the line or leader. Ordinarily, a line or leader threads into an eye only from the end of the line.

In general, the self-threading eye projects from a structural member of a fishing device in such a way that the eye proper is formed by a curved portion which extends from the structural member in pig-tail fashion so as to cross the initial part of the projecting portion and to terminate in a guard which may be so shaped as to serve also as a guide for leading a line into the eye. Thus, in the drawing, the initial part of the eye is indicated at 49; the pig-tail at 50; the eye proper at 51; the guard at 52, and the point of crossing at 53.

Shown in United States Patent No. 1,377,309 is a fish bait which is attachable to, or detachable from, a hook, but it is to be particularly noted in that disclosure, the operative functioning of the bait is in a structural environment or zone separate and distinct from the structural environment or zone of the hook. In other words, Chapel's bait and hook are in "tandem" relation to each other, and each has operative functioning exclusively in its own respective individual environment or zone. In the invention, on the contrary, the operative functioning of the fly structure and that of the hook structure always take place in an environment or zone that is common to both, virtually, one and the same environment or zone. Furthermore, the fly structure and the hook structure are substantially parallel to each other instead of being in tandem.

Referring to Figs. 2 and 8, it is to be noticed that slipping the leader into the self-threading eye, the leader is first placed in the position indicated at 29a, after which it is pulled around, approximately the path indicated by the arrow 41, thus bringing it into the final position 29b used in casting.

In actual practice it has been demonstrated that to accidentally jerk the leader out of this position in ordinary casting is practically impossible, since the position necessary to disengage is seldom or never attained in casting.

When a fish grasps or "strikes" the fly, its open jaws are approximately in the position indicated by the dotted line 37 in Fig. 1. Obviously, after the fish strikes still farther in the direction of the arrow 38, its upper jaw contacts the body-tip 30, at about this time the fish tastes the artificial hackle and according to tests, its natural tendency is to spit the fly out. In so doing, the hook 26 is in such a position that the very act of spitting out the fly causes the hook to penetrate the lower jaw, because of the fact that the entire fly structure is free to move forward a limited distance on the hook shank and on the leader, thereby placing the barb of the hook in the most favorable position for deep penetration in the lower jaw. From actual observation, it has been learned that in the majority of actual cases the fish is caught in the manner described, but it is to be understood that this is not necessarily always the case since it frequently happens that the upper jaw is penetrated when the fly is approached from a different angle by the fish.

While in the art of fishing there is a definite difference between a fly and a lure, yet so far as this invention is concerned the two terms may be used synonymously, since the essential parts of the invention are present whether the enticing structure for the fish is a fly or a lure.

The fastening between the fly and the hook, by means of which the two are easily and quickly separable from each other, may advantageously form an integral part of either the fly or the hook, or the fastening may be of a two-part form, one part being integral with the fly, and the other with the hook.

In Fig. 9 is shown a construction in which a fastening 42 depends from a fly structure 43 and at its lower end carries an enlargement such as a bulb 45, which in turn may be held in a spring channel or clip 46, the latter being integral with the shank 47 of the fish hook. The fly structure 43 carries a body 48 upon which a fly or lure structure (not shown) is built as previously described herein.

The ease and rapidity with which flies are attached or detached in the field by means of the invention can readily be understood. Also, the almost perfect concealment of the hook in the normal position of the hackle. Because of the fact that the hook, when a fish strikes the fly in the normal position, assumes an almost ideal point for penetration, the "getaways" are reduced to a minimum. In Fig. 1 the jaws of a fish are indicated just before closing on the fly in an advantageous position for penetration.

In back-casting, it frequently happens that a hook strikes rocks or other obstructions and is destroyed; ordinarily this would cause the loss of the entire fly, but by means of the invention the fly can be used over and over again.

While in the present instance specific fastening means between the fly and the hook and leader are shown and described by way of convenience in disclosing the invention, it is to be understood that innumerable changes could be made by skilled persons without departing from the spirit and scope of the following claims.

Having fully described my invention, what I claim is:

1. A fishing device, comprising a lure, a lure mounting having fastening means, a fish hook engageable substantially parallel with, or disengageable from, the said mounting while constantly preserving the individual integrity of the said mounting with its fastening, and the said hook, and a line permanently fastened to the said fish hook; the said fishing device further, being characterized by the fact that the said lure mounting when disengaged from the hook is at the same time free of the said permanently fastened line.

2. A fishing fly, comprising an artificial fly structure having a frontal eye and fastening means spaced apart from the said frontal eye; a fish hook engageable by the said fastening means, and a leader attached to the said hooks; the said frontal eye being engageable by the said leader.

3. A detachable fishing fly, including in combination, a skeleton and an open eyelet at substantially the front of the skeleton; a fishing fly mounted on the said skeleton, and means for detachably holding the skeleton on the shank of a fish hook in such a manner that the leader of the hook passes through the said open eye and is detachable therefrom.

4. A detachable fishing fly in accordance with claim 3, in which the means for detachably holding the said skeleton on the said hook includes a loop in which the shank of the hook is engaged; the said loop being spaced apart from the said open eye.

5. A detachable fishing fly in accordance with claim 3 in which the means for detachably holding the said skeleton on the said hook includes at least one loop in which the shank of the hook is engaged, the said loop being so constructed that it prevents substantial angular displacement of the hook relative to the skeleton.

6. A fishing fly including in combination, a skeleton comprising a body, an eye adapted to be threaded with a leader at the front of the body, a fastening adapted to be detachably engage a fish hook and located rearwardly of the said eye, and a tail extending from the said body; an artificial fly mounted on the said skeleton, a fish hook in detachable engagement with the said eye, and a leader connected to the said hook, the said leader being detachably threaded in the said eye.

7. A fishing fly in accordance with claim 6, but including means to keep the hook in substantially constant angular position with reference to rotation about the longitudinal axis of the shank of the hook relative to the longitudinal axis of the said body.

8. A fishing fly in accordance with claim 6, wherein space is provided between the said fish hook and the said skeleton eye, so that the said skeleton has limited movement from the normal fishing position of the skeleton along the shank of the hook and towards the said leader.

9. A skeleton mounting comprising a frontal self-threading eye disposed to receive a fishing leader, and having a fastening spaced apart from the said eye, the said fastening being disposed to detachably hold a fish hook which is directly and permanently attached to the said leader.

10. A skeleton mounting with detachable fish hook and leader comprising a mounting having a self-threading eye disposed to receive the leader or to discharge the leader, and a fastening between the mounting and the fish hook whereby the two are attachable to, or detachable from, each other, without disturbing the individual integrity of either one, the said fish hook being directly and permanently fastened to the said leader.

11. The combination, including a fish hook having a shank, a fly, engaging means between the said fly and the said shank, and a line permanently connected to the said fish hook; the said engaging means being so constituted that it permits the said fly to be detached from the said shank and from the said line without severing the connection between the said fish hook and the said line, and without disassembling the fly.

12. A fish hook connected to a line, and a fly attachable to, or detachable from, the said fish hook and from the said line without disconnecting the said fish hook from the said line.

13. A fishing device, including in combination, a hook, a line attached to the hook, and a fly engaged in substantially parallel relation with the said hook, the said fly being attachable to, or detachable from, both the hook and the line while continually preserving the individual structural integrity of the fly and the hook, and without detaching the said line from the hook.

14. The combination, which includes an integral structure representing a complete fishing fly and a separate integral fish-hook structure arranged so as to be functionally operative in one and the same structural environment, the said complete integral fly structure and the integral hook structure being attachable to, or detachable from, each other, without destroying the integrity of either one.

15. A fishing device and a line to which it is attachable, including in combination, a structural member, an eye forming a part thereof, and a line threadable at a point between its ends into the eye, the said eye having an initial portion projecting from the structural member, a curved portion extending from the initial portion in pig-tail fashion so as to cross the initial part of the eye, and a terminal guard positioned in operative relation to the pig-tail.

16. A fishing device and a line to which it is attachable, including in combination, a structural member, an eye forming a part thereof, and a line threadable at a point between its ends into the eye, and a terminal guide positioned in operative relation to the pig-tail so as to lead a line into the said eye.

17. A skeleton mounting adapted to engage a line intermediate the ends of the line, including in combination, a pig-tail extending from the said mounting so as to constitute an eye, and means operative to guide the said line into the eye.

18. A fishing device, including in combination, a skeleton having a frontal eye, a fastening spaced apart from the frontal eye, a flexible connector threaded through the said frontal eye, and means effective to guide the said flexible connector into the frontal eye at a point intermediate the extremities of the flexible connector.

GROVER R. AUSTAD.